(12) United States Patent
Hong et al.

(10) Patent No.: US 8,411,615 B2
(45) Date of Patent: Apr. 2, 2013

(54) POWER CONTROLLED ADAPTIVE MODULATION AND CODING SCHEME IN SATELLITE COMMUNICATIONS SYSTEM

(75) Inventors: Tae-Chul Hong, Daejeon (KR); Kunseok Kang, Daejeon (KR); Do-Seob Ahn, Daejeon (KR); Ho-Jin Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 246 days.

(21) Appl. No.: 12/943,182

(22) Filed: Nov. 10, 2010

(65) Prior Publication Data

US 2011/0149836 A1    Jun. 23, 2011

(30) Foreign Application Priority Data

Dec. 17, 2009    (KR) .................. 10-2009-0126459

(51) Int. Cl.
  *H04B 7/185*    (2006.01)
(52) U.S. Cl. ...................................... 370/318
(58) Field of Classification Search .................. 370/252, 370/253, 315–318, 320, 328–339, 341, 342; 455/13.4, 522
  See application file for complete search history.

(56) References Cited

U.S. PATENT DOCUMENTS 6,385,462 B1    5/2002   Baum et al.
2007/0060188 A1  3/2007   Cho
2008/0254760 A1  10/2008  Wu et al.

FOREIGN PATENT DOCUMENTS

| KR | 10-2003-0034262 A | 5/2003 |
| KR | 10-2003-0084154 A | 11/2003 |
| KR | 10-2005-0066560 A | 6/2005 |
| KR | 10-2008-0047450 A | 5/2008 |

OTHER PUBLICATIONS

Paul Bender et al., "CDMA/HDR: A Bandwidth-Efficient High-Speed Wireless Data Service for Nomadic Users", IEEE Communication Magazine, pp. 70-77, Jul. 2000.

*Primary Examiner* — Kerri Rose
(74) *Attorney, Agent, or Firm* — Rabin & Berdo, P.C.

(57) ABSTRACT

A power controlled adaptive modulation and coding (AMC) scheme in a satellite communications system includes: calculating, by a user terminal, a received signal-to-noise ratio (SNR) through a packet received from a base station; removing a power control level applied to a packet received before the received packet from the calculated received SNR, and deciding the value obtained by decreasing the calculated received SNR by the power control level; deciding an AMC mode based on the decided received SNR; determining whether power control is required, and deciding a required power control magnitude depending on a channel state positioned in the AMC mode range; transmitting the decided AMC mode and the decided power control information to the base station through channel quality indicator (CQI) feedback; and applying the AMC mode based on information received, and increasing a power by a power control magnitude decided from the received information.

10 Claims, 7 Drawing Sheets

POWER CONTROLLED ADAPTIVE MODULATION AND CODING SCHEME IN SATELLITE COMMUNICATIONS SYSTEM

CROSS-REFERENCE(S) TO RELATED APPLICATIONS

The present application claims priority of Korean Patent Application No. 10-2009-0126459, filed on Dec. 17, 2009, which is incorporated herein by reference in its entirety.

BACKGROUND OF THE INVENTION

1. Field of the Invention

Exemplary embodiments of the present invention relate to a power controlled adaptive modulation and coding (hereafter, referred to as 'AMC') scheme in a satellite communications system; and, more particularly, to a power controlled AMC scheme in a satellite communications system which has a long round trip time (RTT) because of its wide cell region.

2. Description of Related Art

The AMC scheme is a transmission scheme which has been used in 1×Evolved Data Only (1×EV DO) of a third generation (3G) mobile communication system standardized with the 3G Partnership Project 2 (3GPP2), and is being currently used in a variety of mobile communication systems including High Speed Downlink Packet Access (HSDPA), WiBro (WiMax), Digital Video Broadcasting—Satellite—Second Generation (DVB-S2), and 3GPP Long Term Evolution (LTE).

The 1×EV DO of the 3GPP2 is representative technology designed for packet services. It adopts the packet switching to improve the spectrum efficiency, which is disclosed in a paper published by Paul Bender et al., CDMA/HDR: A Bandwidth-Efficient High-Speed Wireless Data Service for Nomadic Users, IEEE communication Magazine, July 2000. In the forward link, packets transmitted to each user are multiplexed by each time slot in time division multiplexing. The packets in each time slot are always transmitted from a base station in a maximum available power.

Accordingly, each user measures a received signal to interference ratio (SIR) with respect to pilot symbols which are added to the central part of each time slot, selects a transmission rate appropriate for the current condition based on a predetermined transmission rate table, and reports the selected transmission rate to the base station. The base station performs scheduling for packets to be transmitted based on the transmission rate selected by each user, and transmits packets in a selected slot at the selected transmission rate. The 1×EV DO of the 3GPP2 supports 12 different packet transmission rates depending on different symbol repetition numbers, modulation types, and code rates. Since packets are transmitted at a maximum rate in the 1×EvDO of the 3GPP2, the 1×EvDO system has an advantage that it needs not perform power control in the forward link.

Basically, the AMC scheme is applied in the same manner as the 1×EV DO system of the 3GPP2. Depending on systems, a code assignment or subcarrier allocation scheme may be combined with the AMC scheme.

However, such an AMC scheme is designed under an assumption that the channel state is maintained within a constant range during a short RTT. Therefore, a terminal should continuously report information about the channel state to the base station at constant intervals. However, since satellite communications systems have a long RTT, they require a much longer time than ground communications systems, until the information reported at constant intervals is reflected. Therefore, it is difficult to apply the basic assumption of the AMC scheme that the channel state is maintained within a constant range.

Meanwhile, an AMC scheme such as DVS-2, which is used in a state in which the mobility of terminals does not exist, offsets the effects of rain attenuation. In this AMC scheme, channel variation is not fast in comparison with the long RTT of the satellite communications system. Therefore, there is no problem in applying the assumption. In the case of mobile communication using a satellite, however, channel variation caused by the long RTT is so severe that the same AMC scheme as the DVS-2 cannot be applied.

SUMMARY OF THE INVENTION

An embodiment of the present invention is directed to a power controlled AMC scheme which may be applied to a mobile communication environment using a satellite which has a long RTT and in which channel variation is severe.

Another embodiment of the present invention is directed to a power controlled AMC scheme which is capable of preventing a reduction in performance of an AMC scheme caused by a long RTT in a satellite communications system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a power controlled AMC scheme in a satellite communications system includes: calculating, by a user terminal, a received signal-to-noise ratio (SNR) through a packet received from a base station; removing a power control level applied to a packet received before the received packet from the calculated received SNR, and deciding the value obtained by decreasing the calculated received SNR by the power control level as a final received SNR; deciding an AMC mode based on the decided received SNR; determining whether power control is required or not, and deciding a required power control magnitude depending on a channel state positioned in the AMC mode range, when it is determined that the power control is required; transmitting the decided AMC mode and the decided power control information to the base station through channel quality indicator (CQI) feedback; and applying the AMC mode based on information received when the base station transmits the packet, and increasing a power by a power control magnitude decided from the received information. The power control magnitude is calculated by the following expression: power control magnitude calculated by using received information+(round trip time (RTT) margin−AMC mode range)).

In accordance with another embodiment of the present invention, a method for deciding an AMC mode in a satellite communications system includes: calculating a received power from a received signal; calculating a difference between the received power and a margin for RTT to decide a final received power; and selecting an AMC mode based on the final received power.

DESCRIPTION OF SPECIFIC EMBODIMENTS

Exemplary embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Hereafter, a power controlled AMC scheme in a satellite communications system in accordance with an embodiment of the present invention will be described with reference to the drawings.

Figure 1:
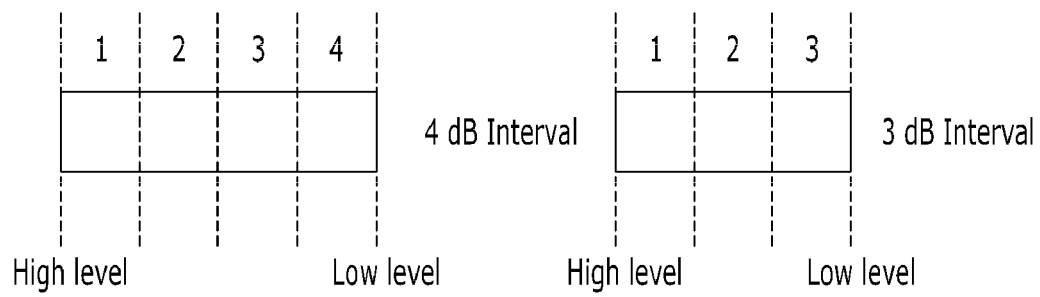
FIG. 1 is a diagram showing division of positions at which AMC levels are decided within an AMC mode range.

First, referring to FIG. 1, the application environment of the power controlled AMC scheme in accordance with an embodiment of the present invention will be described in detail. FIG. 1 is a diagram showing division of positions at which AMC levels are decided within an AMC mode range.

Since the satellite communications system has a long RTT, it is highly likely that the channel state might be already varied significantly before the channel information is reflected to change the mode of the AMC scheme. Therefore, the satellite communications system requires a larger AMC mode range (interval) than the ground communications system. However, when the AMC mode range increases, the position of the channel state within the AMC mode range may have an effect upon an outage probability based on the use of the AMC scheme. The outage probability refers to a probability at which a current channel state will deviate from the channel state range of the AMC mode range. The outage probability considers only a case in which the channel state worsens.

Referring to FIG. 1, 4 dB and 3 dB AMC mode ranges may be divided by 1 dB interval. In this case, although the same AMC mode is decided, the outage probability may increase when the channel state is positioned at a region 3 of the 3 dB AMC mode range or a region 4 of the 4 dB AMC mode range than when the channel state is positioned at a region 1.

When the AMC mode range is decided at first, it is assumed that channel variation during an RTT may be accepted. However, when the AMC mode range is actually applied, a channel margin corresponding to the AMC mode range decided at first is not secured. For example, when channel variation of 4 dB is to be accepted, the channel state during the mode decision should be positioned at the region 1. If channel variation of 4 dB occurs when the channel state is positioned at a region other than the region 1, an outage event occurs.

In general, it is assumed that when the AMC scheme is used, a fixed value of power is used as a power to be transmitted. Depending on conditions, the AMC scheme changes a transmission method instead of adjusting a power level. Therefore, changing the transmission method and adjusting the power level do not need to be used at the same time.

However, in the power controlled AMC scheme in accordance with the embodiment of the present invention, an open loop power control method is utilized to set a power which maintains a signal-to-noise ratio (SNR) required for obtaining a desired bit error rate (BER), in order to determine a base or initial power corresponding to an AMC mode.

Therefore, in the power controlled AMC scheme in accordance with the embodiment of the present invention, real-time power control is not performed when a general AMC mode is used. However, when an AMC mode used in the poorest channel state among the AMC modes is set, the AMC mode cannot be converted into an AMC mode which is stronger against a channel error, depending on the channel states. In this case, an accumulative BER or SNR may be monitored to perform the open loop power control. Meanwhile, even when an AMC mode used in the best channel state is set, the open loop power control may be performed.

Figure 2:
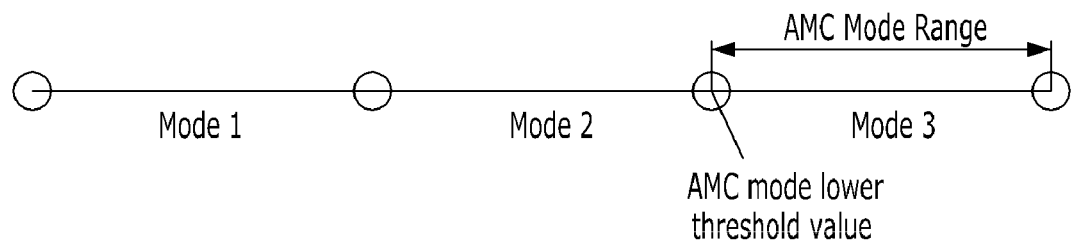
FIG. 2 is a diagram showing examples of an AMC mode range and a lower threshold value.

When such an AMC mode is used in a satellite system having a long RTT, the outage probability is defined as Equation 1 below, in order to analyze a method capable of reducing the outage probability. In Equation 1, when an AMC mode is decided in the power controlled AMC scheme in accordance with the embodiment of the present invention, a lower threshold value of the AMC mode range is assumed as a threshold value for maintaining performance based on the AMC mode, as shown in FIG. 2. FIG. 2 shows the size of the AMC mode range and the lower threshold value.

$$P_{outage} = P(RS(t+RTT) < RS_{th}(t) | RS(t) = RS_0) \quad \text{Eq. 1}$$

Here, RS(t) represents a received power at time t, $RS_{th}(t)$ represents a lower threshold received power of an AMC mode corresponding to the received power at time t, $RS_0$ represents an arbitrary real number, and RTT represents a round trip time.

The outage probability defined in Equation 1 may be adjusted as Equation 2 below in accordance with the conditional probability definition.

$$P_{outage} = \frac{P(RS(t+RTT) < RS_{th}(t) \cap RS(t) = RS_0)}{P(RS(t) = RS_0)} \quad \text{Eq. 2}$$

In Equation 2, when the RTT is sufficiently large, RS(t) and RS(t+RTT) may be assumed as independent events. Therefore, Equation 2 may be adjusted as Equation 3 below.

$$P_{outage} = P(RS(t+RTT) < RS_{th}(t)) \quad \text{Eq. 3}$$

In order to reduce the outage probability of Equation 3, a condition satisfying $RS(t+RTT) \geq RS_{th}(t)$ should be maintained.

RS(t), RS(t+RTT), and $RS_{th}(t)$ of Equation 3 may be expressed as Equations 4 to 6 below. In this case, $RS(t+RTT) \geq RS_{th}(t)$ may be expressed as Equation 7 below.

$$RS(t) = TP\left(t - \frac{RTT}{2}\right) + CH(t) \quad \text{Eq. 4}$$

$$RS(t+RTT) = TP\left(t + \left(\frac{RTT}{2}\right)\right) + CH(t+RTT) \quad \text{Eq. 5}$$

$$RS_{th}(t) = TP\left(t - \left(\frac{RTT}{2}\right)\right) + CH_{th}(t) \quad \text{Eq. 6}$$

Here, TP(t) represents a transmitted power at time t, CH(t) represents a channel gain at time t, and $CH_{th}(t)$ represents a channel gain which causes a received power at time t to become $RS_{th}(t)$ with respect to a transmitted power at time t−(RTT/2).

$$\left\{TP\left(t + \left(\frac{RTT}{2}\right)\right) - TP\left(t - \left(\frac{RTT}{2}\right)\right)\right\} \geq CH(t) - CH(t-RTT) \quad \text{Eq. 7}$$

where $$\left\{TP\left(t + \left(\frac{RTT}{2}\right)\right) - TP\left(t - \left(\frac{RTT}{2}\right)\right)\right\}$$

indicates a difference between the transmitted power at time t−(RTT/2) and a transmitted power at time t+(RTT/2).

Therefore, Equation 7 may be expressed as Equation 8 below.

$$\Delta TP \geq CH_{th}(t) - CH(t+RTT) \quad \text{Eq. 8}$$

In Equation 8, when it is assumed that a fixed transmitted power is used, ΔTP becomes zero. Therefore, in order for $CH_{th}(t)-CH(t+RTT)$ to have a smaller value than zero, CH(t+RTT) should have a larger value or $CH_{th}(t)$ should have a smaller value. Since CH(t+RTT) is a channel state after time t+RTT, CH(t+RTT) is not a variable which can be controlled. On the other hand, since $CH_{th}(t)$ is a value indicating a threshold value with respect to the AMC mode at time t, $CH_{th}(t)$ may be controlled by setting the threshold value to a value as low as possible, that is, the AMC mode range to a range as wide as possible.

When the AMC mode range was decided, $CH_{th}(t)$ in Equation 8 is a constant which is already decided at time t, and CH(t+RTT) is not a variable which can be controlled, because CH(t+RTT) is the channel state at time t+RTT. On the other hand, when it is assumed that the transmitted power may be controlled in real time, ΔTP is a variable which may be controlled. Since a fixed transmitted power is maintained in a general AMC mode, ΔTP is zero. In the satellite communications system having a long RTT, however, the transmitted power may be controlled in such a manner that ΔTP has a large value, in order to reduce the outage probability. That is, although ΔTP is zero in the ground communications system having a short RTT, it is highly likely that CH(t+RTT) has a larger value than $CH_{th}(t)$. In the satellite communications system having a long RTT, however, it is not highly likely that CH(t+RTT) has a larger value than $CH_{th}(t)$. Therefore, the probability of the satellite communications system may approach the probability of the ground communications system, only when ΔTP has a value as large as possible.

Therefore, when the AMC scheme and the power control method capable of controlling ΔTP are combined and used, it is possible to effectively apply the AMC scheme even in the satellite communications system having a long RTT.

In the power controlled AMC scheme in accordance with the embodiment of the present invention, when an AMC mode is decided, the power control may be performed in real time by controlling ΔTP. As described above, when the AMC mode is selected in the region 4 of the 4 dB AMC mode range, the power control is performed to secure a margin corresponding to the region 1.

Figure 3:
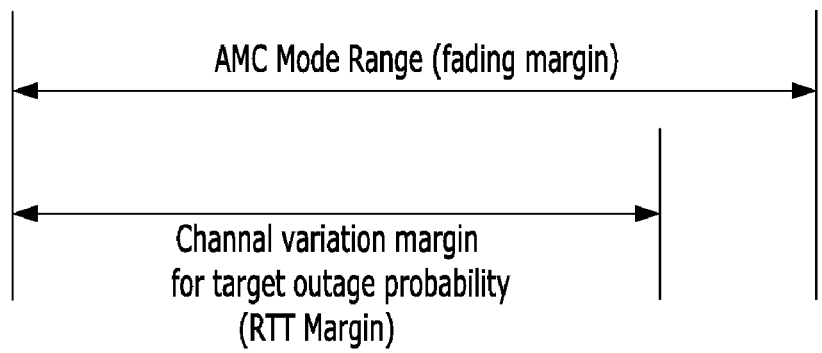
FIG. 3 is a diagram showing a case in which the size of an AMC mode range is larger than a RTT margin.
Figure 4:
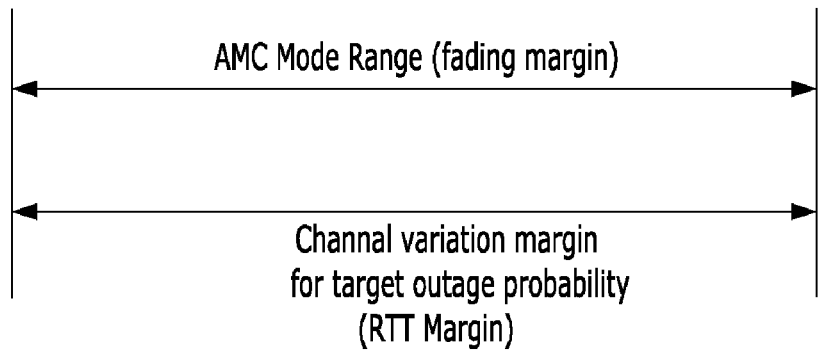
FIG. 4 is a diagram showing a case in which the size of the AMC mode range is equal to the RTT margin.
Figure 5:
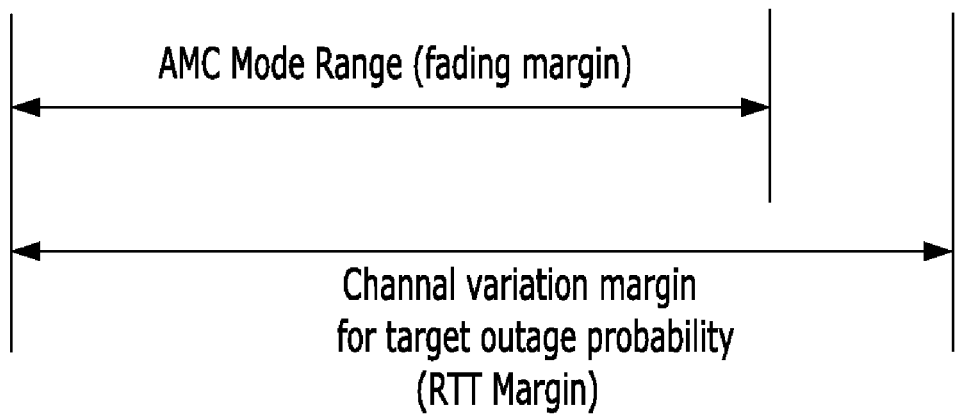
FIG. 5 is a diagram showing a case in which the size of the AMC mode range is smaller than the RTT margin.

FIG. 3 is a diagram showing a case in which the size of the AMC mode range is larger than the RTT margin. FIG. 4 is a diagram showing a case in which the size of the AMC mode range is equal to the RTT margin. FIG. 5 is a diagram showing a case in which the size of the AMC mode range is smaller than the RTT margin.

The concepts of the AMC mode range having an effect upon $CH_{th}(t)$ in Equation 8 and the margin for controlling ΔTP to accept channel uncertainty during the RTT will be described by taking the following cases as examples. The AMC mode range indicates an interval between AMC modes, and the RTT margin indicates a margin which may accept channel variation during a time required for varying the AMC mode by reflecting channel quality indicator (CQI) information. In the satellite communications system, the effect of the long RTT is the most decisive. Therefore, the margin is referred to as the RTT margin.

1. AMC Mode Range>RTT Margin

Referring to FIG. 3, the case in which the AMC mode range is larger than the RTT margin is not a realistic case, because the AMC mode range is set so as to accept the channel variation during the time required for varying the AMC mode by reflecting the CQI information. Therefore, when the AMC mode range is set to be larger than the RTT margin, an operation of reducing a power during the power control may be included. In this case, however, since the number of AMC modes decreases, a gain obtained by the use of the AMC scheme decreases.

2. AMC Mode Range=RTT Margin

Referring to FIG. 4, the case in which the AMC mode range is equal to the RTT margin is a general case. In this case, the AMC mode range is set so as to accept the channel variation during the time required for varying the AMC mode by reflecting the CQI information.

3. AMC Mode Range<RTT Margin

Referring to FIG. 5, when the AMC mode range is smaller than the RTT margin, the number of available AMC modes may be increased to reduce the outage probability. In this case, a power should be always increased by (RTT margin-AMC mode range).

Figure 6:
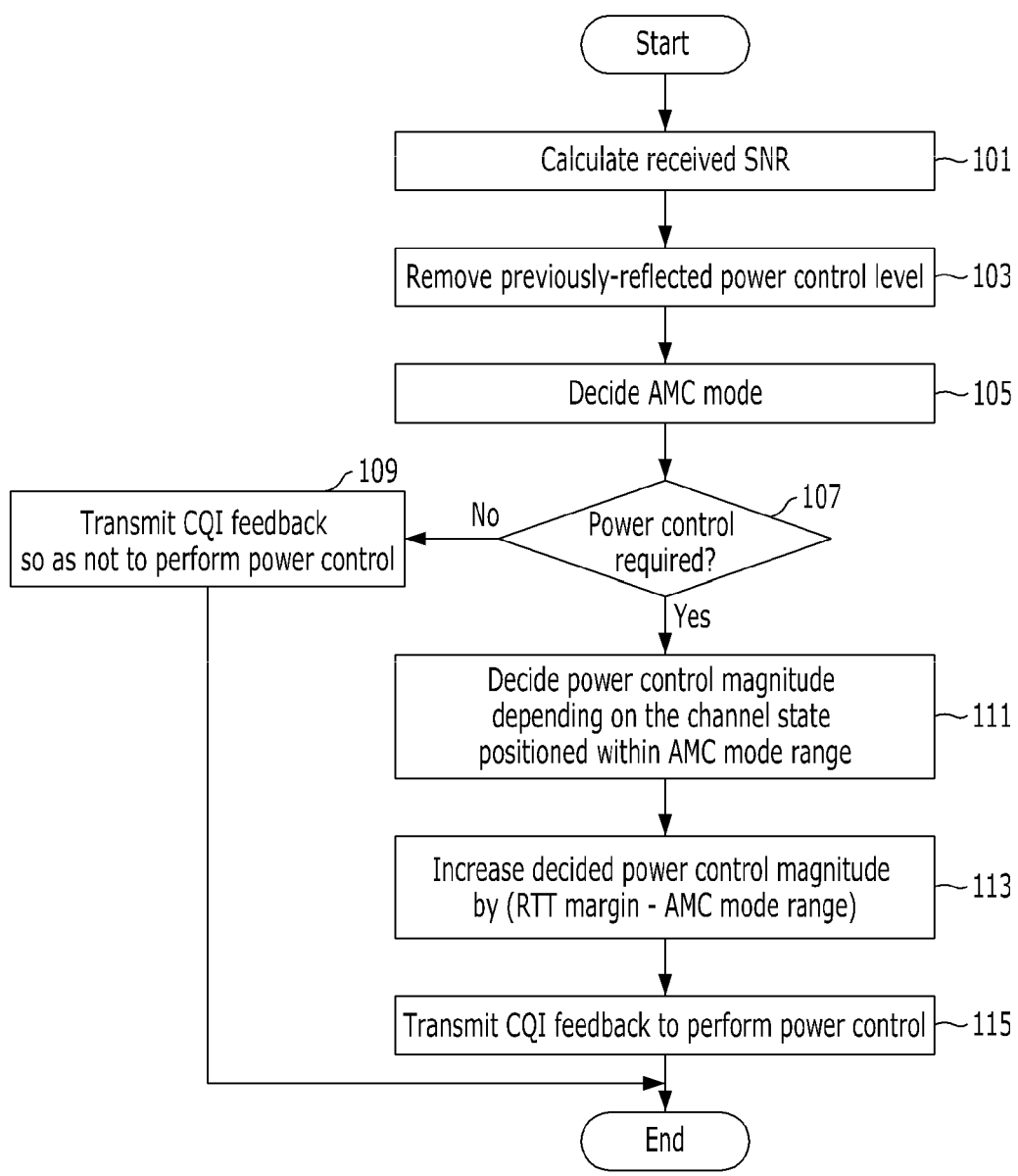
FIG. 6 is a flow chart showing a procedure in which a power controlled AMC scheme in accordance with an embodiment of the present invention is applied.

FIG. 6 is a flow chart showing a procedure in which the power controlled AMC scheme in accordance with the embodiment of the present invention is applied. Referring to FIG. 6, the power controlled AMC scheme in accordance with the embodiment of the present invention will be described in detail.

First, in a step S101, a user terminal calculates a received SNR though a packet received from a satellite. In a step S103, a previously reflected power control level is removed from the calculated received SNR. At this time, when the power was previously increased by a value A, a value obtained by subtracting the value A from the calculated received SNR is considered to be a final received SNR. In a step S105, an AMC mode is decided based on the received SNR calculated in the step S103.

In a step S107, it is determined whether power control is required or not. When the power control is not required, the operation proceeds to a step S109. In the step S109, CQI feedback is transmitted so as not to perform the power control, and the operation is terminated. On the other hand, when the power control is required, the operation proceeds to a step S111.

In the step S111, a required power control magnitude is decided depending on the channel state positioned within the AMC mode range. In a step S113, the decided power control magnitude is increased by (RTT margin−AMC mode range).

In a step S115, CQI feedback is transmitted to perform the power control as much as required, and the operation is completed.

When the previously reflected power control level is removed from the calculated received SNR in the step S103 to decide the received SNR, the channel state may be prevented from being considered to be favorable due to the added power. Therefore, it is possible to prevent the AMC mode from being converted into an AMC mode appropriate for a favorable channel state. The added power is provided not to change the AMC mode into an AMC mode appropriate for a favorable channel state, but to reduce the outage probability in the currently decided AMC mode.

Figure 7:
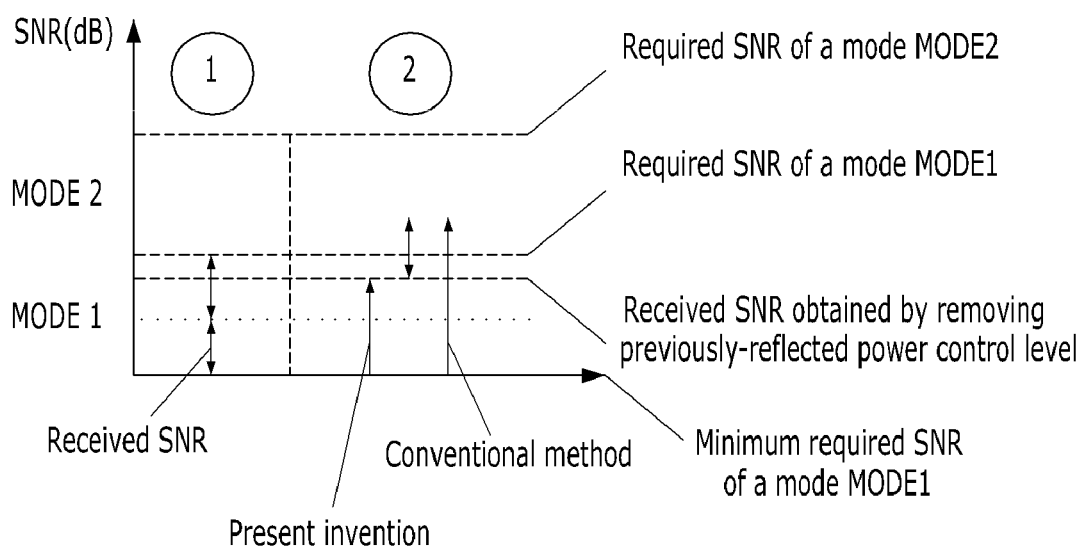
FIG. 7 is a diagram comparatively showing the effects of the power controlled AMC scheme in accordance with the embodiment of the present invention and a conventional received SNR decision method.

The above-described step S103 will be described in more detail with reference to FIG. 7. FIG. 7 is a diagram comparatively showing the effects of the power controlled AMC scheme in accordance with the embodiment of the present invention and a conventional received SNR decision method.

As described above, general AMC schemes are used together with the open loop power control. Therefore, a difference between a required SNR and a current SNR is supplemented by the power control, in order to satisfy a BER for required performance. However, the open loop power control does not coincide with a CQI update period, but is performed in accordance with its period. Therefore, the open loop power control averagely approaches a BER in an AMC mode which is rapidly varied through the CQI update. When it is assumed that the open loop power control used in an existing AMC scheme is reflected in the same manner as the CQI update, a difference between the power controlled AMC scheme in accordance with the embodiment of the present invention and the conventional received SNR decision method will be described.

While the conventional received SNR decision method increases a power by (required SNR−current SNR), the power controlled AMC scheme in accordance with the embodiment of the present invention increases a power by (required SNR−current SNR+(RTT margin−AMC mode range)). Therefore, when the RTT margin is different from the size of the AMC mode range, the power controlled AMC scheme in accordance with the embodiment of the present invention becomes quite different from the conventional received SNR decision method. When the RTT margin is equal to the size of the AMC mode range, the calculation expressions of both methods becomes identical. In the power controlled AMC scheme in accordance with the embodiment of the present invention, however, when the current SNR is calculated, a power increased by the previous power control is subtracted from the current SNR, and the current SNR is then used. Therefore, although the calculation expressions of both methods become identical, the magnitude of the power to be increased by the power control in the power controlled AMC scheme in accordance with the embodiment of the present invention is different from that of the conventional received SNR determination method.

FIG. 7 shows which effect such a difference has. In FIG. 7, it is assumed that the required SNR defined in the power controlled AMC scheme in accordance with the embodiment of the present invention is identical to that defined in the conventional method. Furthermore, it is assumed that the power control is performed in a region ① by a difference between the received SNR and a required SNR of a mode MODE1 and the channel state is improved in a region ② such that the received SNR exceeds an upper threshold value. In this case, the power controlled AMC scheme in accordance with the embodiment of the present invention subtracts the power increased by the power control when the received SNR is calculated. Therefore, the received SNR still exists in the mode MODE1. In the conventional method, however, since the received SNR is positioned in the mode MODE2, the AMC mode is changed.

In the conventional method, the received SNR may be suitable for the mode MODE1, when the power control is not performed. However, when the power is unnecessarily increased to change the AMC mode from the mode MODE1 to the mode MODE2, the power consumption may increase. Furthermore, since the power control is required to the required SNR in the mode MODE2, the power consumption may continuously increase.

Therefore, the power controlled AMC scheme in accordance with the embodiment of the present invention removes an unnecessary power increase, compared with the conventional method. Therefore, it is possible to reduce the power consumption caused by the additional power control.

Figure 8:
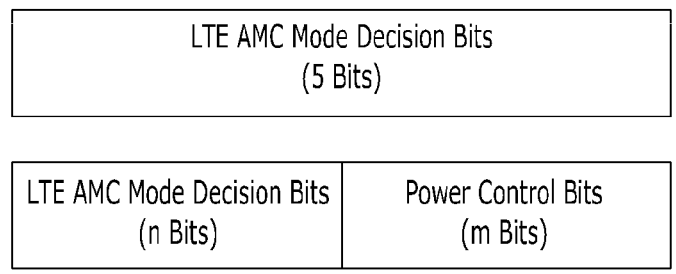
FIG. 8 is a diagram comparatively showing the bit configuration of LTE CQI information and the bit configuration of the CQI information of the power controlled AMC scheme in accordance with the embodiment of the present invention.

FIG. 8 is a diagram comparatively showing the bit configuration of LTE CQI information and the bit configuration of the CQI information of the power controlled AMC scheme in accordance with the embodiment of the present invention.

In the power controlled AMC scheme, a method for deciding a power level at which power control is required may be expressed as Equation 9 below.

$$\text{Upper threshold value of AMC mode}-\text{received SNR}+ \\ (\text{RTT margin}-\text{AMC mode range}) \quad \text{Eq. 9}$$

However, when an actual system transfers an instruction to control the power level as much as the value calculated by Equation 9, it may increase a signaling cost of the system. Referring to FIG. 8, the 3GPP LTE system uses five bits in order to perform the AMC mode selection. Through the five bits, 29 AMC modes are decided. On the other hand, the size of the AMC mode range in the satellite communications system cannot be reduced so as to be equal to that of the ground communications system. Therefore, it is determined that the number of bits required for reporting the AMC mode may range from 2 to 3. Accordingly, in the satellite communications system, 5 bits of CQI information may be divided into AMC mode decision bits (n bits) and power control bits (m bits) as shown in FIG. 8, in order to apply the power controlled AMC while maintaining the compatibility with the ground 3GPP LET system. A specific application of this configuration will be described below with reference to FIG. 9.

Figure 9:
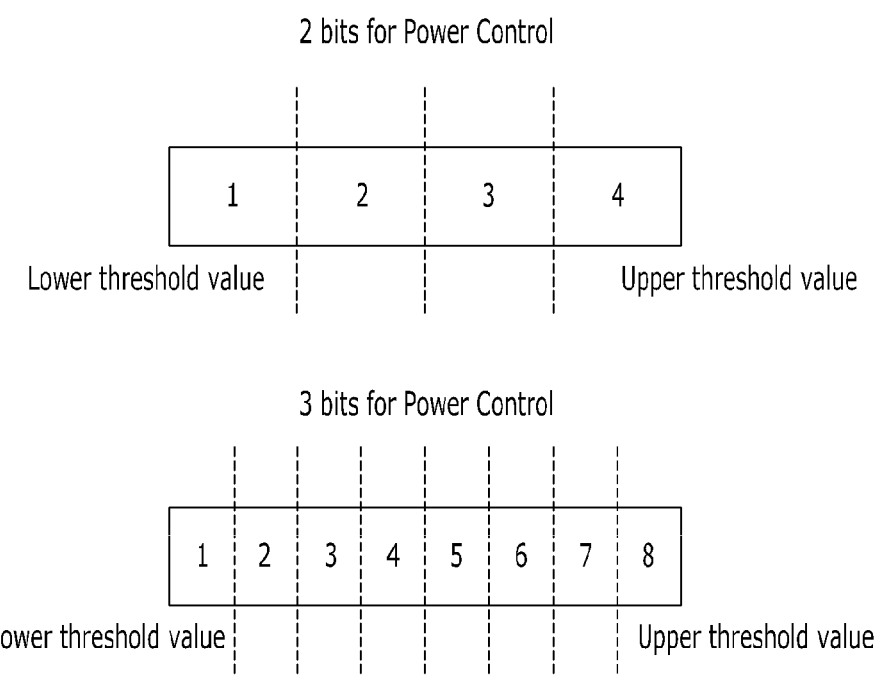
FIG. 9 is a diagram showing a method for dividing the AMC mode range depending on the number of power control bits in the power controlled AMC in accordance with the embodiment of the present invention.

FIG. 9 is a diagram showing a method for dividing the AMC mode range depending on the number of power control bits in the power controlled AMC in accordance with the embodiment of the present invention.

The AMC mode decision bits including n bits divide $2^n$ AMC modes, and the power control bits including m bits divide the AMC mode range based on the bit number such that the divided AMC mode range is used for performing the power control. Referring to FIG. 9, when m is 2, the AMC mode range is divided into four sections, and when m is 3, the AMC mode range is divided into eight sections. Depending on at which section a received SNR calculated by receiving a packet is positioned among the $2^n$ sections, the power control level is decided. For example, when m is 2, the power control may be set so as not to be performed at the fourth section, the power may be increased by (AMC mode range)/4 at the third section, the power may be increased by 2*(AMC mode range)/4 at the second section, and the power may be increased by 3*(AMC mode range)/4 at the first section.

In short, when m is 2 as shown in FIG. 9, the AMC mode range is divided into $2^m$ channel state sections, and numbers are sequentially given to the divided sections from the section close to the lower threshold value. At this time, when it is assumed that the divided sections have the same size (dB), the power to be increased depending on the sections in which the current channel state exists may be expressed as Equation 10 below.

$$(2^m\text{-section in which current channel state exists}) \times \text{size of one section}$$

That is, when the number of the section in which the current channel state exists is b and the size of one section is set to k dB, Equation 10 may be expressed as $(2^m-b)*k$ dB. In the fourth section close to the upper threshold value, the power control is not performed, that is, b is set to 4. Therefore, the power to be increased becomes 0 dB. In the case in which the current channel state exists in the third section, that is, b is set to 3, the power to be increased becomes k dB. In the case in which the current channel state exists in the second section, that is, b is set to 2, the power to be increased becomes 2 k dB. In the case in which the current channel state exists in the first section, that is, b is set to 1, the power to be increased becomes 3 k dB.

Therefore, when the section at which the received SNR is positioned is reported through the CQI, the transmission side may decide and transmit the power control level. The transmission side may apply a predetermined power control level to increase the power, without using the sections obtained by dividing the AMC mode range depending on the position of the received SNR. Therefore, when the predetermined power control level is p dB, Equation 10 may be expressed as $(2^m-b)*p$ dB.

In the satellite communications system, the power controlled AMC in accordance with the embodiment of the present invention may be adaptively applied by adjusting the numbers of n bits and m bits depending on a user's position. When the channel varies relatively stably, the AMC mode range may be reduced in size such that a larger number of AMC modes are used to increase transmission efficiency. On the other hand, when the channel varies rapidly, the AMC mode range may be enlarged to increase the stability. When a larger number of AMC modes are used, the transmission efficiency may increase. However, since the range divided for power control is widened, the power control may be not performed elaborately. When the AMC mode range is enlarged, the transmission efficiency may decrease. However, since the range divided for power control is narrowed, the power control may be performed elaborately. Therefore, the power controlled AMC in accordance with the embodiment of the present invention may be adaptively applied in accordance with the channel state depending on the user's position. To adaptively apply the power controlled AMC in accordance with the embodiment of the present invention, variations in the outage probability and the received SNR may be observed to decide whether or not to change the numbers of n bits and m bits. When the decision is finalized, the changed numbers may be noticed to a receiver through signaling such that a CQI is transmitted in accordance with the changed rule.

Figure 10:
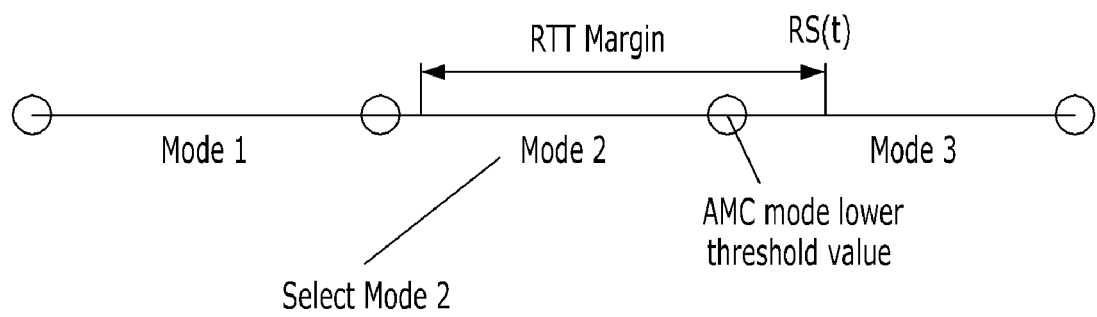
FIG. 10 is a diagram showing a method for applying an AMC scheme when the AMC scheme cannot be combined with the power control.

FIG. 10 is a diagram showing a method for applying an AMC scheme when the AMC scheme cannot be combined with the power control.

When the AMC scheme is applied in a satellite communications system, the satellite communications system may not have a power enough to perform the power control as described above. In this case, the AMC scheme may be applied in accordance with the method as shown in FIG. 10. When a received signal power RS(t) exists in a mode MODE3, the mode MODE3 may be selected to perform transmission. However, when an RTT is long as in the satellite communications system, a margin for channel variation should be secured, but RS(t) does not have a sufficient margin from a lower threshold value of the mode MODE3. Furthermore, a power required for performing the power control is not secured. In this case, a mode MODE2 corresponding to a value obtained by subtracting the AMC mode range or the RTT margin from the received power RS(t) may be selected. When the AMC mode is selected in such a manner, a required margin may be secured without performing the power control. However, when a mode operating at a low power does not exist any more, a transmission quality cannot be guaranteed. Furthermore, as described above, the power controlled AMC scheme may be changed and applied depending on the environment. When the power control cannot be performed, the AMC scheme may be applied depending on the environment, by changing a margin which is subtracted from the received power RS(t). That is, when the user environment is favorable, the margin may be reduced to select the mode MODE3 in the case as shown in FIG. 10.

In accordance with the embodiments of the present invention, when the power controlled AMC scheme in the satellite communications system is applied, it is possible to reduce the probability at which the channel state will deviate from the currently-set threshold value of the AMC scheme depending on the channel variation during the long RTT. Therefore, it is possible to a frame error rate (FER). Furthermore, since various AMC schemes may be applied to the satellite communications system, it is possible to increase the transmission efficiency of the satellite communications system.

While the present invention has been described with respect to the specific embodiments, it will be apparent to those skilled in the art that various changes and modifications may be made without departing from the spirit and scope of the invention as defined in the following claims.

What is claimed is:

1. A power controlled adaptive modulation and coding (AMC) scheme in a satellite communications system, comprising:

calculating, by a user terminal, a received signal-to-noise ratio (SNR) through a packet received from a base station;

removing a power control level, applied to a previously-received packet, from the calculated received SNR, and using the calculated received SNR, after the removal of the power control level, as a final received SNR;

deciding an AMC mode based on the final received SNR;

determining whether power control is required, and when the power control is determined to be required, deciding a required power control magnitude using a channel state positioned in a corresponding AMC mode range; and transmitting the decided AMC mode and a power control information of the decided power control magnitude to the base station through channel quality indicator (CQI) feedback.

2. The power controlled AMC scheme of claim 1, wherein when it is determined that the power control is not required, CQI feedback is transmitted so as not to perform the power control.

3. The power controlled AMC scheme of claim 1, wherein The decided power control information divides the channel state, to which the AMC mode is applied, into 2n sections to perform the power control, and indicates at which section a current channel state is positioned.

4. The power controlled AMC scheme of claim 3, wherein numbers are sequentially given to the 2n sections from one of the sections closest to a lower threshold value, and when the size of one section is set to k dB and a channel state of a receiver exists in a section of which the number is b, a transmitter increases a power by (2n−b)*k dB.

5. The power controlled AMC scheme of claim 3, wherein numbers are sequentially given to the 2n sections from one of the sections closest to a lower threshold value, and when a predetermined power control level to be applied for a power increase is set to p dB and a channel state of a receiver exists in a section of which the number is b, a transmitter increases a power by (2n−b)*p dB.

6. The power controlled AMC scheme of claim 3, wherein when the current channel state section for channel information required for the AMC scheme is decided, a receiver decides a channel state section in a state in which the magnitude of the power varied by the power control is excluded.

7. The power controlled AMC scheme of claim 1, wherein when the AMC mode is applied, the satellite communications system varies a number of the AMC modes to be used and a size and a number of sections for dividing the channel to perform the power control.

8. The power controlled AMC scheme of claim 7, wherein the variations in the number of AMC modes and the size and number of sections for dividing the channel to perform the power control are decided by utilizing an outage probability, at which a current channel state deviates from the channel state to which the channel state information and the AMC mode are applied, and factors having an effect upon the outage probability.

9. A method for deciding an adaptive modulation and Coding (AMC) mode in a satellite communications system, comprising:
    calculating, using a user terminal, a received power from a signal Received by the user terminal:
    calculating, using a user terminal, a difference between the received power and a margin for a round trip time (RTT) to decide a final received power, the margin being a range in which a channel state is positioned and that causes no outage during channel variation; and
    selecting, using a user terminal, an AMC mode based on the final received power.

10. The method of claim 9, wherein the margin for RTT is controlled and applied depending on an environment of the user terminal.

\* \* \* \* \*